（12）United States Patent
Hayashi

(10) Patent No.: US 9,272,554 B2
(45) Date of Patent: Mar. 1, 2016

(54) IMAGE PROCESSING DEVICE, DITHER MASK GENERATION METHOD, AND PROGRAM

(71) Applicant: SEIKO EPSON CORPORATION, Tokyo (JP)

(72) Inventor: Takuma Hayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/606,124

(22) Filed: Jan. 27, 2015

(65) Prior Publication Data

US 2015/0210100 A1   Jul. 30, 2015

(30) Foreign Application Priority Data

Jan. 29, 2014  (JP) ................................ 2014-014092

(51) Int. Cl.
*B41J 2/205* (2006.01)
*B41J 29/393* (2006.01)
*B41J 2/21* (2006.01)
*G06K 15/10* (2006.01)

(52) U.S. Cl.
CPC .............. *B41J 29/393* (2013.01); *B41J 2/2139* (2013.01); *B41J 2/2146* (2013.01); *G06K 15/102* (2013.01)

(58) Field of Classification Search
CPC .... B41J 2/2139; B41J 2/2146; B41J 2/04593; G06K 15/102; G06K 2215/0085
USPC ................................................ 347/14, 15, 19
See application file for complete search history.

(56) References Cited

U.S. PATENT DOCUMENTS 7,607,757 B2 * 10/2009 Silverbrook et al. ........... 347/49
7,758,147 B2 *  7/2010 Sheahan et al. ................. 347/19
2015/0070428 A1 *  3/2015 Sudo et al. ...................... 347/14

FOREIGN PATENT DOCUMENTS

JP          2004-202795 A       7/2004

* cited by examiner

*Primary Examiner* — An Do
(74) *Attorney, Agent, or Firm* — Global IP Counselors, LLP

(57) ABSTRACT

An image processing device includes a storing section configured to store a predetermined dither mask, a defective nozzle detecting section configured to detect a defective nozzle, and an interpolation processing section configured to specify a mask position corresponding to a position of the detected defective nozzle among mask positions included in the dither mask, and alter a threshold of a predetermined mask position so that a dot of the predetermined mask position included in the dither mask becomes ON when a dot of the specified mask position is ON.

9 Claims, 8 Drawing Sheets

IMAGE PROCESSING DEVICE, DITHER MASK GENERATION METHOD, AND PROGRAM

CROSS-REFERENCE TO RELATED APPLICATIONS

This application claims priority to Japanese Patent Application No. 2014-014092 filed on Jan. 29, 2014. The entire disclosure of Japanese Patent Application No. 2014-014092 is hereby incorporated herein by reference.

BACKGROUND

1. Technical Field

The present invention relates to an image processing device, a dither mask generation method, and a program.

2. Related Art

In a printer such as an inkjet printer, etc., an ink ejection cannot be sometimes performed by an occurrence of clogging with ink in an ink nozzle. In this regard, JP-A-2004-202795 (Patent Document 1) discloses that dither processing is performed by selecting one dither mask among a plurality of dither masks so that a dot on a line corresponding to a non-ejection nozzle among image data becomes non-ejection. In the selected dither mask, a threshold is set so that a gradation can be expressed at normal ejection positions other than non-ejection positions.

SUMMARY

According to Patent Document 1, however, it is required to previously prepare a plurality of dither masks depending on positions of non-ejection nozzles in addition to a normal dither mask used when no non-ejection nozzle exists. For this reason, it is required to sufficiently prepare resources such as memory storing capacity, etc., which causes increase in cost.

The present invention aims, even in the case of using a dither mask corresponding to a non-ejection nozzle, to reduce resources required for a dither mask and prevent deterioration of gradation due to dither processing even if a non-ejection nozzle occurs.

A first embodiment of the present invention for solving the aforementioned objects is an image processing device including a storing section configured to store a predetermined dither mask, a defective nozzle detecting section configured to detect a defective nozzle, and an interpolation processing section configured to specify a mask position corresponding to a position of the detected defective nozzle among mask positions included in the dither mask, and alter a threshold of a predetermined mask position so that a dot of the predetermined mask position included in the dither mask becomes ON when a dot of the specified mask position is ON. With this, it is possible to prevent gradation of image quality from being deteriorated due to decrease in dots corresponding to the defective nozzle. Further, since a change is added to a previously prepared dither mask, it is not required to increase the number of dither mask depending on the position of the defective nozzle, etc., and therefore resources required for the dither mask can be reduced.

In the aforementioned image processing device, it can be configured such that the interpolation processing section specifies a raster position of processing target image data corresponding to the position of the detected defective nozzle, and specifies a mask position corresponding to the specified raster position in a case in which the dither mask is repeatedly applied to the image data. With this, even in cases where the correspondence relation between the nozzle position and the dither mask position changes depending on the raster position of the image data, the mask position corresponding to the defective nozzle position can be specified.

In the image processing device, it can be configured such that, in a case in which a dot of the specified mask position is ON, the interpolation processing section specifies an upper adjacent mask position belonging to an upper line adjacent to a line to which the specified mask position belongs or a lower adjacent mask position belonging to a lower line, and alters a threshold of the upper adjacent mask position or the lower adjacent mask position so that a dot of the upper adjacent mask position or the lower adjacent mask position becomes ON. With this, the dot of the adjacent mask position nearest to the mask position corresponding to the defective nozzle position, which does not belong to a line to which the mask position corresponding to the defective nozzle position belong, is set to ON, and deterioration of image quality can be prevented.

In the image processing device, it can be configured such that when both dots of the upper adjacent mask position and the lower adjacent mask position are OFF, the interpolation processing section reverses a threshold of the specified mask position and a threshold of either one of the upper adjacent mask position and the lower adjacent mask position. With this, dots corresponding to the defective nozzle appear at the adjacent mask position where the dot is OFF, and therefore it is possible to prevent gradation of image quality from being deteriorated.

In the image processing device, it can be configured such that when a dot of one of the upper adjacent mask position and the lower adjacent mask position is ON and a dot of the other of the upper adjacent mask position and the lower adjacent mask position is OFF, the interpolation processing section reverses a threshold of the specified mask position and a threshold of the other of the upper adjacent mask position and the lower adjacent mask position. With this, dots corresponding to the defective nozzle appear at the adjacent mask position where the dot is OFF, and therefore it is possible to prevent gradation of image quality from being deteriorated.

In the image processing device, it can be configured such that when both dots of the upper adjacent mask position and the lower adjacent mask position are ON, the interpolation processing section sets so that the size of at least one of the dots of the upper adjacent mask position and the lower adjacent mask position becomes larger. With this, a dot corresponding to the defective nozzle appears at the adjacent mask position where the dot is OFF by increasing the size of the dot, and therefore it is possible to prevent gradation of image quality from being deteriorated.

In the image processing device, it can be configured such that the interpolation processing section judges whether or not a dot of the mask position is ON by comparing a threshold of the mask position and a gradation value determined based on a predetermined duty. With this, ON or OFF of a dot can be judged without actually performing dither processing to image data.

A second embodiment of the present invention for solving the aforementioned object is a dither mask generation method including detecting a defective nozzle, and specifying a mask position corresponding to a position of the detected defective nozzle among mask positions included in a dither mask, and altering a threshold of a predetermined mask position so that a dot of the predetermined mask position included in the dither mask becomes ON when a dot of the specified mask position is ON. With this, it is possible to prevent gradation of image quality from being deteriorated due to decrease in dots corresponding to the defective nozzle. Further, since a change is added to the previously prepared dither mask, it is not required to increase the number of dither mask depending on the position of the defective nozzle, etc., and therefore the resource required for the dither mask can be reduced.

A third embodiment of the present invention for solving the aforementioned object is a non-transitory computer readable medium storing a program causing an image processing device to execute detecting a defective nozzle, and specifying a mask position corresponding to a position of the detected defective nozzle among mask positions included in a dither mask, and altering a threshold of the predetermined mask position so that a dot of the predetermined mask position included in the dither mask becomes ON when a dot of the specified mask position is ON. With this, it is possible to prevent gradation of image quality from being deteriorated due to decrease in dots corresponding to the defective nozzle. Further, since a change is added to the previously prepared dither mask, it is not required to increase the number of dither mask depending on the position of the defective nozzle, etc., and therefore the resource required for the dither mask can be reduced.

BRIEF DESCRIPTION OF THE DRAWINGS

Referring now to the attached drawings which form a part of this original disclosure.

DETAILED DESCRIPTION OF EMBODIMENTS

Hereinafter, an embodiment of the present invention will be described with reference to drawings.

Figure 1:
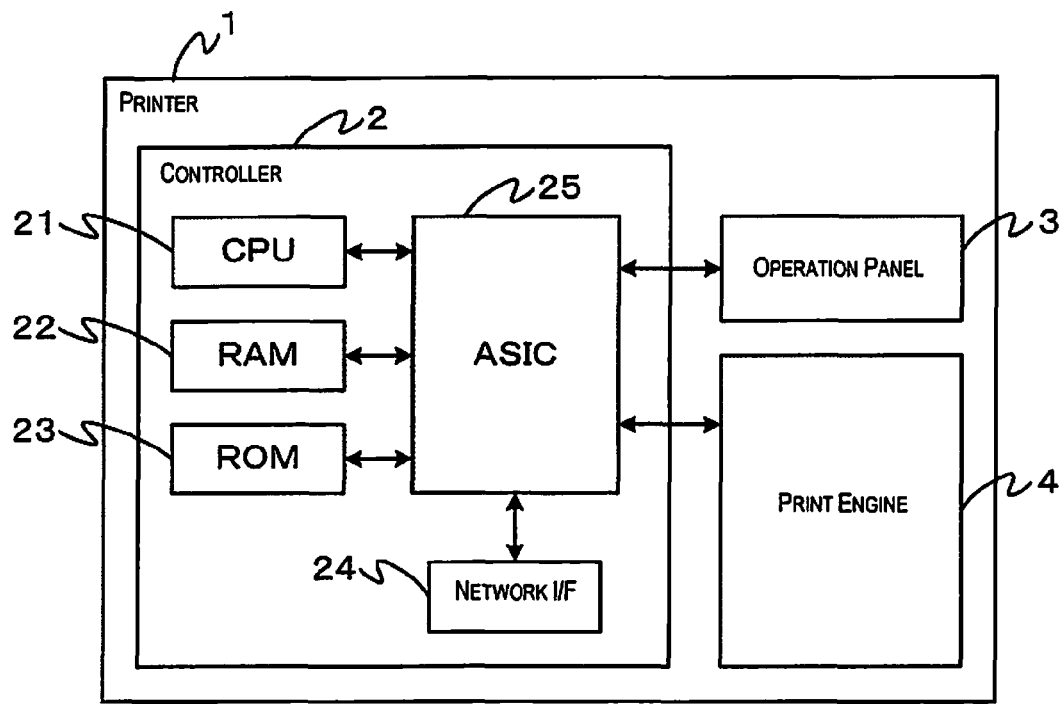
FIG. 1 is a view illustrating an example of a hardware structure of a printer according to one embodiment of the present invention.

FIG. 1 is a view illustrating an example of a hardware structure of a printer according to one embodiment of the present invention. In this embodiment, a nozzle in which abnormality, such as non-ejection of ink, etc., has occurred will be referred to as "defective nozzle."

A printer 1 is an image processing device for performing printing on a printing medium, such as a printing paper, etc., using one or more color inks based on a print target data received from a computer connected via a network or print target data read out from a portable recording medium.

As shown in FIG. 1, the printer 1 is equipped with a controller 2, an operation panel 3, and a print engine 4.

The controller 2 is a unit for controlling the entire printer 1. The controller 2 executes, for example, processing of making the print engine 4 execute printing based on print target data, display processing in the operation panel 3, processing of detecting an operation of a user on the operation panel 3.

The controller 2 is provided with a CPU (Central Processing Unit) 21, a RAM (Random Access Memory) 22, a ROM (Read Only Memory) 23, a Network I/F (I/F Interface) 24, an ASIC (Application Specific Integrated Circuit) 25, etc.

The CPU 21 executes various kinds of processing in accordance with the program loaded in the RAM 22. The RAM is a volatile memory for storing various programs, data, etc., such as a DRAM (Dynamic RAM). The ROM 23 is a non-volatile memory in which various programs, data, etc., are stored, and is a flash ROM capable of rewriting data. The Network I/F 24 is connected to a network to perform information transmission and reception with other devices via the network.

The ASIC 25 is provided with an interface circuit for controlling the operation panel 3 or the print engine 4, an image processing circuit for performing various kinds of image processing, an interface circuit for controlling the Network I/F, etc. The ASIC 25 performs, for example, under the control of the CPU 21, generation processing of print data for controlling the print engine 4, processing for driving the print engine 4 based on the print data by transmitting a control signal, processing for transmitting the display data stored in the RAM 22 to the operation panel 3, processing for transferring the data received from the operation panel 3 to the CPU 21, the RAM 22, etc.

The operation panel 3 is a unit functioning as an input/output interface between the printer 1 and a user. The operation panel 3 is equipped with, for example, a display such as a Liquid Crystal Display, an organic EL display (Electro-Luminescence Display), etc., hard switches, such as a touch panel, a button key, etc., functioning as an input device, etc. The operation panel 3 displays, for example, an operation menu, etc., under the control of the controller 2. Further, the operation panel 3, for example, specifies the touch position corresponding to the X-Y coordinate of the displayed image, converts the touch position into the coordinate to output the coordinate to the controller 2.

The print engine 4 is a unit for performing printing on a printing medium.

The print engine 4 is provided with, for example, one or more ink cartridges, a print head which ejects ink supplied form the ink cartridge, a carriage mounting the print head, a carriage driving mechanism which moves the carriage in the main scanning direction, a paper feeding mechanism for feeding a printing medium in a sub-scanning direction, a paper feeding and ejecting mechanism for feeding and ejecting a printing medium (none of them are illustrated), etc. The print head is provided with a plurality of nozzles for ejecting ink drops and ejects ink drops from each nozzle. The print engine 4 executes, under the control of the controller 2, moving of the carriage in the main scanning direction, carrying of the printing medium in the sub-scanning direction, ejecting of ink drops from the nozzle of the print head, etc., to thereby form dots on the printing medium.

The structure of the aforementioned printer 1 is not limited to the above since the above explanation was directed to the main structure to explain the features of the present invention. Further, it does not mean to exclude other structures equipped by a normal printer.

Figure 2:
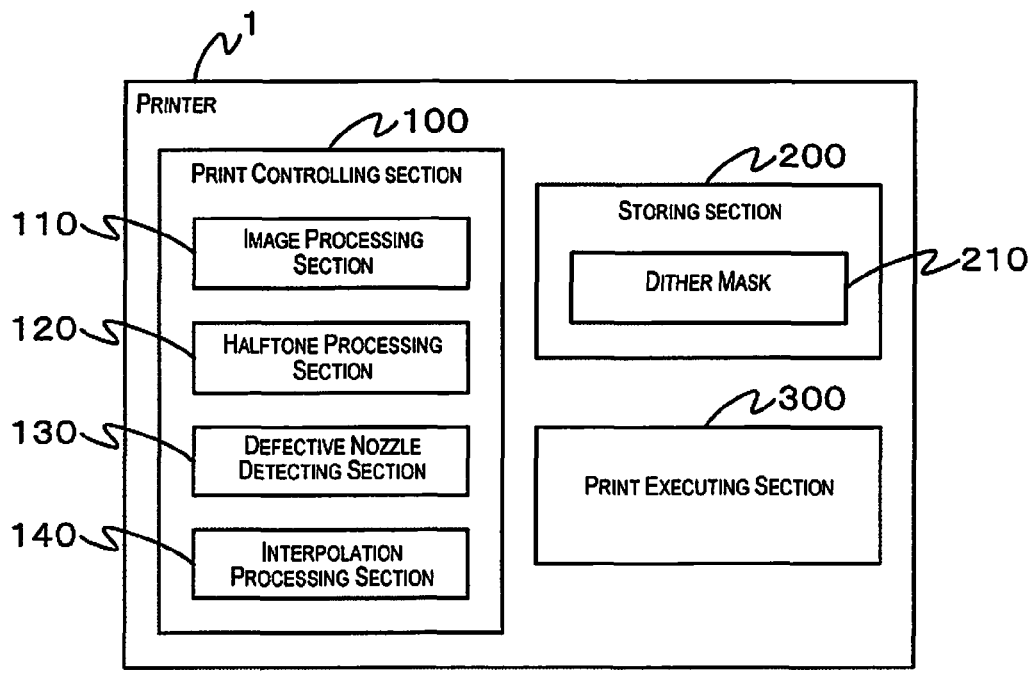
FIG. 2 is a view illustrating an example of a functional structure of the printer.

FIG. 2 is a drawing showing an example of a function structure of the printer. As shown in FIG. 2, the printer 1 is provided with a print controlling section 100, a storing section 200, a print executing section 300, etc.

The print controlling section 100 controls the entire printer 1. The print controlling section 100 obtains a print target data (for example, RGB image data), generates print data by subjecting the print target data to various image processing, and controls the print operation of the print executing section 300 based on the print data. So, the print controlling section 100 includes an image processing section 110, a halftone processing section 120, a defective nozzle detecting section 130, and an interpolation processing section 140. Here, although not only the image processing section 110 but also the halftone processing section 120 and the interpolation processing section 140 are functional sections for executing image processing, to facilitate understanding, the explanation will be made such that image processing other than image processing performed by the halftone processing section 120 and the interpolation processing section 140 is executed by the image processing section 110.

The image processing section 110 executes image processing such as, resolution conversion processing, color conversion processing, interlace processing, etc.

The halftone processing section 120 executes halftone processing to image data of each color after color conversion processing. In this embodiment, the halftone processing section 120 employs a dither method as a halftone processing method. The dither method is a method for judging execution/non-execution of dot formation for each pixel by comparing the threshold set in a dither mask (also referred to as "dither matrix") and the gradation value of image data.

The halftone processing section 120 executes, in the case where no defective nozzle exists, dither processing to the image data after color conversion using the dither mask 210 previously stored in the storing section 200.

On the other hand, the halftone processing section 120 executes, in the case where a defective nozzle exists, dither processing to the image data after color conversion using the dither mask 210 in which the mask value of the dither mask 210 has been changed depending on the position of the defective nozzle. This will be detailed later.

The defective nozzle detecting section 130 detects the position of a defection nozzle among the plurality of nozzles provided on the print head. The detection result will be stored in the storing section 200, etc. The detection of defective nozzles can be performed by using known technologies, and therefore the detail explanation will be omitted. For example, in the case of a mechanism in which ink drops are ejected from a nozzle by generating pressure changes of the ink in a pressure chamber by driving a driving element, the defective nozzle detecting section 130 inspects a defective nozzle based on residual vibrations after causing pressure changes of the ink in the pressure chamber by driving the driving element. Needless to say, the detection method of a defective nozzle is not limited to the above. For example, it can be configured such that the defective nozzle detecting section 130 detects a defective nozzle by receiving the designation of the position, etc., of a defective nozzle from a user via the operation panel 3, the Network I/F 24, etc.

The interpolation processing section 140 alters, in the case where a defective nozzle is detected by the defective nozzle detecting section 130, the mask value of the dither mask 210 depending on the position of the defective nozzle, and outputs the altered dither mask to the halftone processing section 120. The processing of the interpolation processing section 140 will be detailed later. In this embodiment, the processing is called "interpolation processing" in a meaning that dots not formed by a defective nozzle are falsely compensated by dots to be formed by another nozzle.

In the storing section 200, as explained above, one dither mask 210 to be used in the case where no defective nozzle exists (i.e., in a normal state) is stored preliminary. One dither mask is prepared for each color. Of course, a common dither mask may be prepared for a plurality of colors.

The print executing section 300 drives each mechanism of the print head, etc., and executes printing on a printing medium in accordance with a control signal supplied from the print controlling section 100.

The aforementioned print controlling section 100 is realized by executing, for example, a predetermined program that the CPU 21 loaded from the ROM 23 to the RAM 22. Of course, the print controlling section 100 can be realized by utilizing the ASIC 25 by the CPU 21 or realized by the ASIC 25. The storing section 200 can be realized by, for example, the RAM 22 or the ROM 23. Further, the print executing section 300 can be realized by, for example, the print engine 4.

The functional structure of the aforementioned printer 1 is classified depending to main processing contents for easy understanding of the structure of the printer 1. The present invention is not limited by the method of classification or the name of the structural element. The structure of the printer can be further classified into many structural elements depending on the processing contents. Further, one structural element can be classified so as to execute more processing. The processing of each structural element can be executed by single hardware or a plurality of hardware. Further, processing of each structural element can be realized by one program or a plurality of programs.

Figure 3:
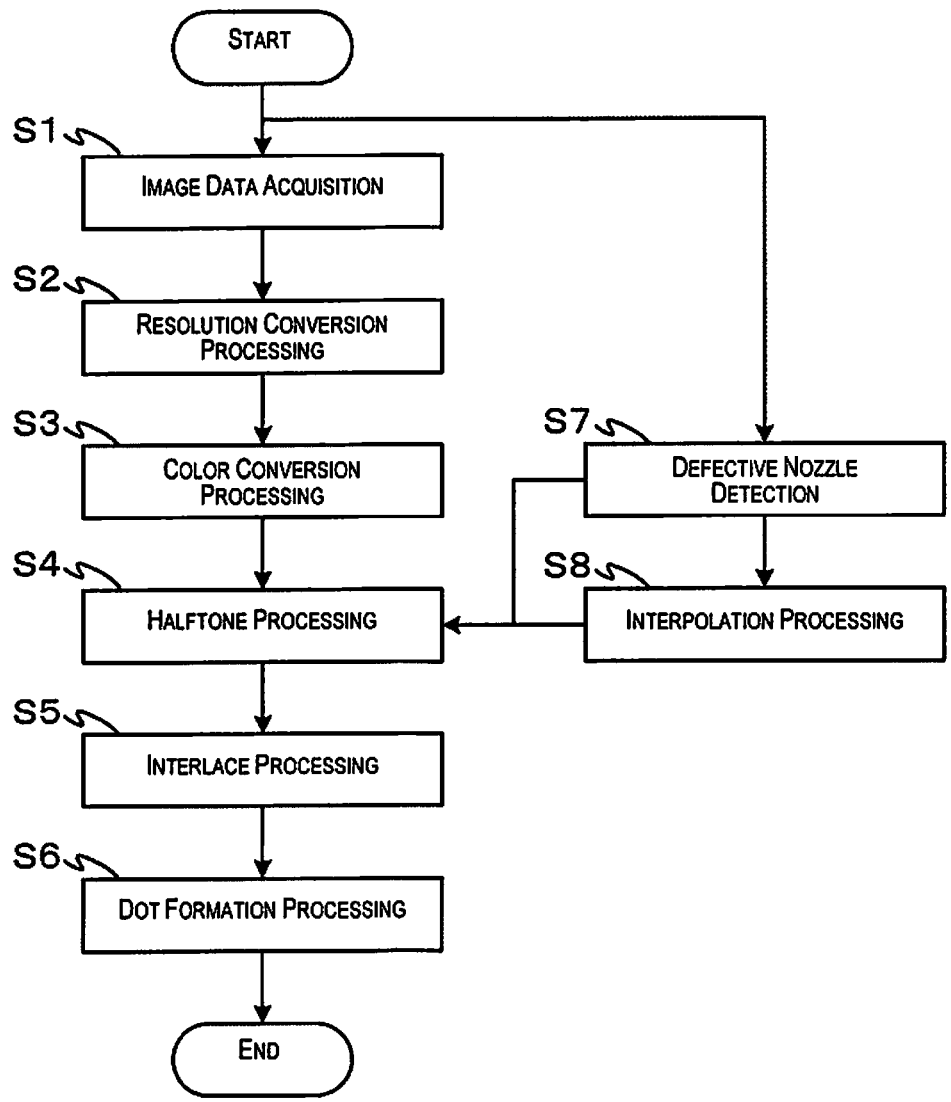
FIG. 3 is a flowchart showing an example of a flow of print processing in the printer.

FIG. 3 is a flowchart showing an example of a flow of print processing in the printer. It is assumed that the processing in Step S7 and Step S8 have been completed before the processing in Step S4 at the latest.

When the flow shown in FIG. 3 starts, the print controlling section 100 obtains print target data (Step S1). The print target data is, for example, RGB image data having a gradation value of each of colors R, G, and B in each pixel forming an image.

Then, the print controlling section 100 executes resolution conversion processing (Step S2). Specifically, the image processing section 110 converts the resolution of the image data obtained in Step S1 into a print resolution used in printing by the print executing section 300. The detail explanation of the resolution conversion processing will be omitted since existing technologies can be used for the resolution conversion processing. It can be configured such that printing is executed without executing the resolution conversion processing.

Then, the print controlling section 100 executes the color conversion processing (Step S3). Specifically, the image processing section 110 converts, using a color conversion table stored in the storing section 200, etc., the RGB image data converted in resolution in Step S2 into image data having a gradation value of one or more colors (e.g., each of CMYK) used in printing. The detail explanation of the color conversion processing will be omitted since existing technologies can be used for the color conversion processing.

On the other hand, the print controlling section 100 detects a defective nozzle (Step S7). Concretely, the defective nozzle detecting section 130 detects the position of the defective nozzle among a plurality of nozzles provided on the head. The detection can be performed by using a result detected the last or previous printing processing, or can be performed after the start of the flow shown in FIG. 3. Further, the detection can be performed based on the information showing the position, etc., of the defective nozzle identified by a user in advance. When no defective nozzle was detected, the defective nozzle detecting section 130 forwards the processing to Step S4. On the other hand, when a defective nozzle is detected, it forwards the processing to Step S8.

When a defective nozzle is detected in Step S7, the print controlling section 100 executes interpolation processing (Step S8). The interpolation processing is executed to each of dither masks used for each of one or more colors (e.g., each color of CMYK) for use in printing. The interpolation processing will be explained later with reference to FIG. 4.

Then, the print controlling section 100 executes the halftone processing (Step S4). Concretely, the halftone processing section 120 executes, when no defective nozzle is detected in Step S7, dither processing to the image data color-converted in Step S3 by repeatedly applying the dither mask 210 previously stored in the storing section 200 in a predetermined arrangement. For example, in the case of CMYK image data, the dither processing is executed to the image data of each color using the dither mask 210 corresponding to each color. On the other hand, in the case where a defective nozzle is detected in Step S7, the halftone processing section 120 executes dither processing to the image data color-converted in Step S3 by repeatedly applying the dither mask altered in mask value of the dither mask 210 depending on the position of the defective nozzle by the interpolation processing section 140 in Step S8 in a predetermined arrangement. For example, in the case of CMYK image data, the dither processing is executed to image data of each color using the dither mask 210 corresponding to each color.

Then, the print controlling section 100 executes interlace processing (Step S5). Concretely, the image processing section 110 rearranges the dot patterns (dot pattern data showing existence or non-existence of formation of dots of each pixel) of the image data halftone-processed in Step S5 in the order that each nozzle of the head forms dots. The detail explanation of the interlace processing will be omitted since existing technologies can be used for the interlace processing. It can be configured such that printing is executed without executing the interlace processing. Further, not only the interlace processing but also processing such as microwave, overlap, etc., can be executed.

Then, the print controlling section 100 executes the dot formation processing (Step S6). Concretely, the print controlling section 100 drives the print executing section 300 based on the print data created in Step S5. With this, dots are formed on the printing medium by the print executing section 300, that is, printing is executed.

Figure 4:
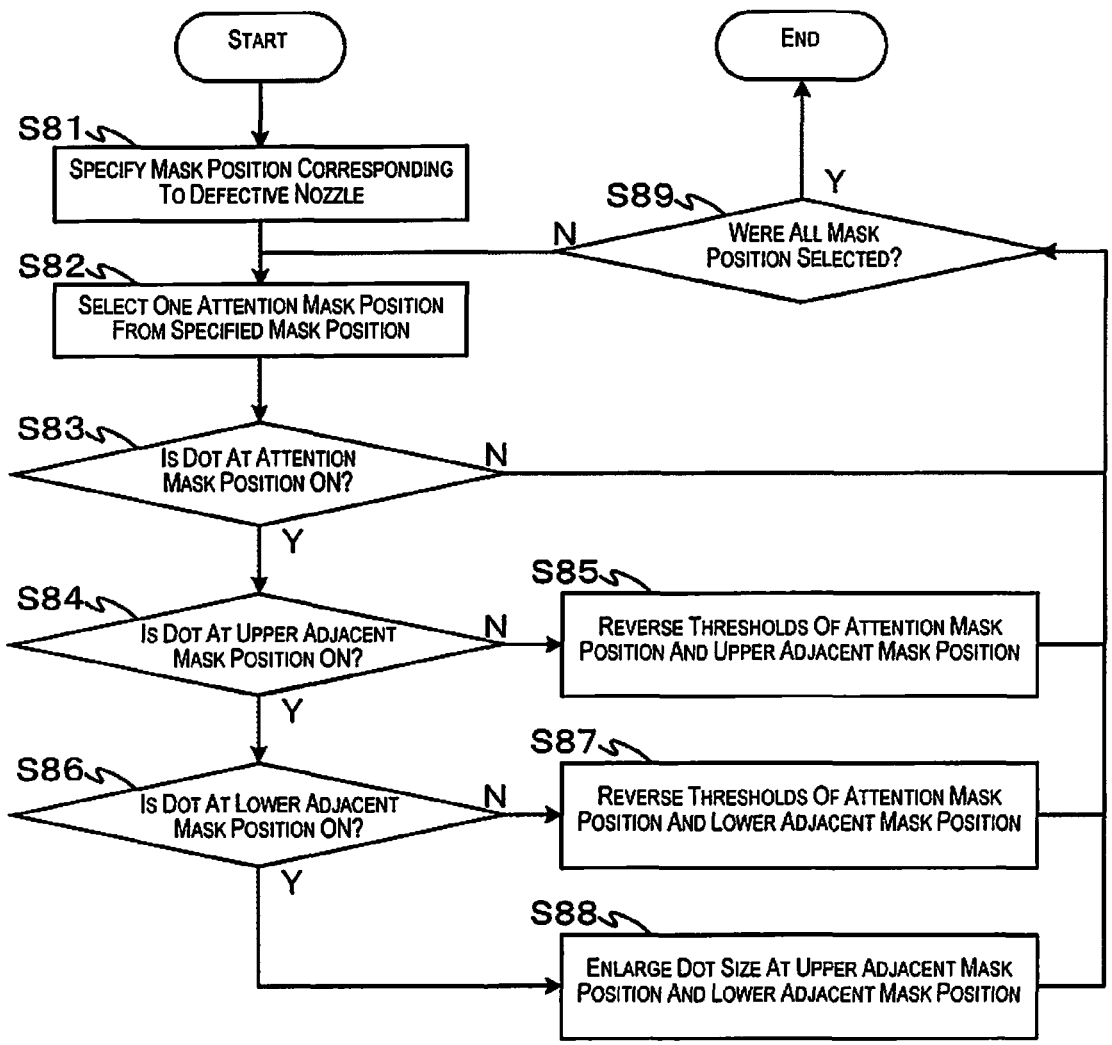
FIG. 4 is a flowchart showing an example of a flow of interpolation processing.

FIG. 4 is a flowchart showing an example of a flow of the interpolation processing. For easy understanding, the following explanation will be made with reference to FIGS. 5 to 7. FIG. 4 shows interpolation processing to a dither mask for use in one color image data. For example, in the case of the image data of CMYK, the interpolation processing section 140 executes the processing of FIG. 4 with respect to the dither mask for use in one color image data.

Figure 5:
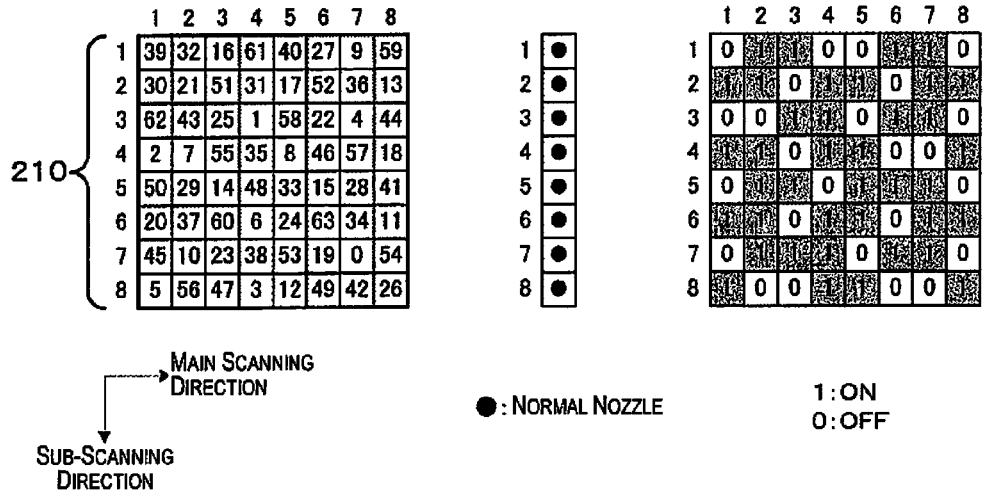
FIG. 5 is a view (part 1) conceptually explaining interpolation processing in the case where a relation between a mask position and a nozzle position does not change.
Figure 6:
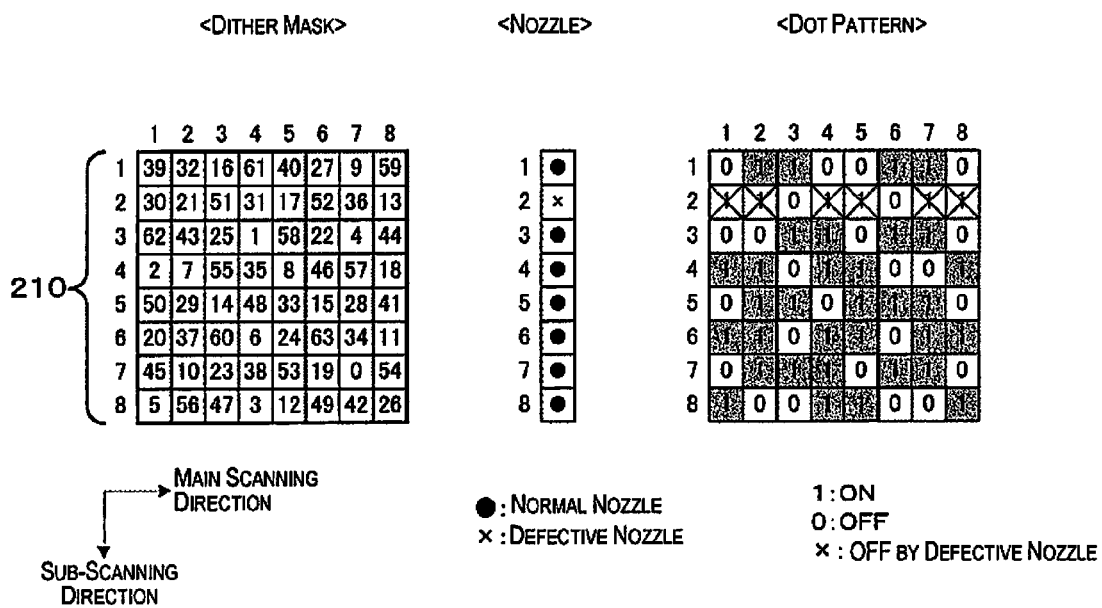
FIG. 6 is a view (part 2) conceptually explaining interpolation processing in the case where a relation between a mask position and a nozzle position does not change.
Figure 7:
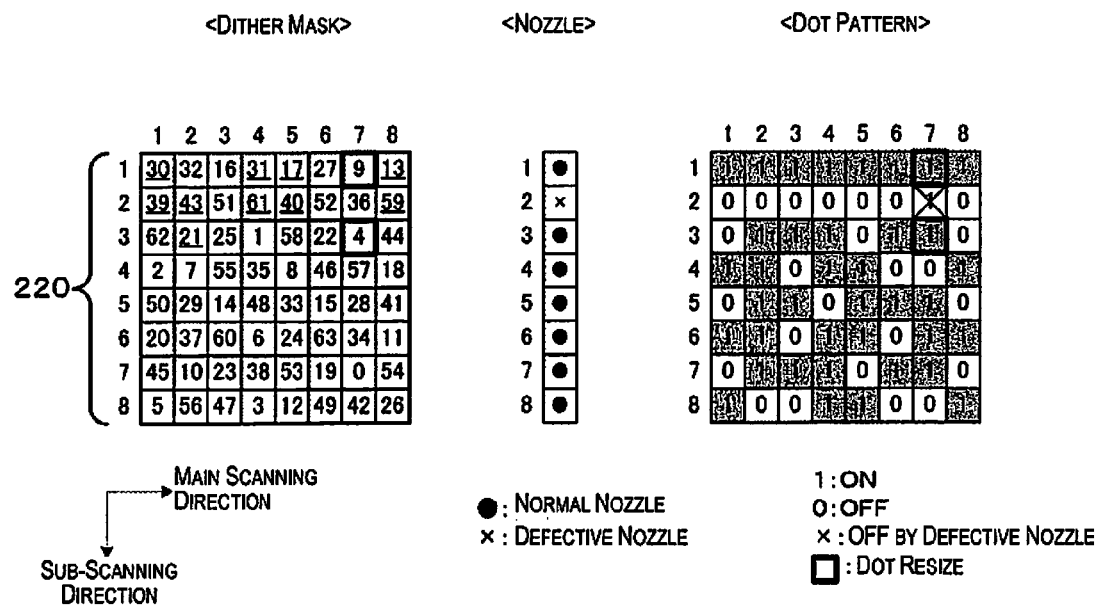
FIG. 7 is a view (part 3) conceptually explaining interpolation processing in the case where a relation between a mask position and a nozzle position does not change.

FIG. 5 is a view (part 1) conceptually explaining the interpolation processing in the case where a relation between a mask position and a nozzle position does not change. FIG. 6 is a view (part 2) conceptually explaining the interpolation processing in the case where a relation between a mask position and a nozzle position does not change. FIG. 7 is a view (part 3) conceptually explaining the interpolation processing in the case where a relation between a mask position and a nozzle position does not change.

FIGS. 5 to 7 show, as one example, the case in which an 8×8 dither mask is repeatedly applied to image data. To each of 64 mask positions constituting the dither mask, 0 to 63 thresholds TH are allotted. Hereinafter, the mask position is represented by a coordinate (sub-scanning position: main scanning position). The dither mask 210 shown in FIGS. 5 and 6 each corresponds to a previously prepared dither mask, and the dither mask 220 shown in FIG. 7 corresponds to a dither mask after interpolation processing.

Further, in FIGS. 5 to 7, the print head is provided with eight nozzles arranged in the sub-scanning direction. The nozzle positions 1 to 8 of each nozzle in the sub-scanning direction and the mask positions 1 to 8 of the dither mask in the sub-scanning direction correspond. Further, as to any raster position (corresponding to the sub-scanning position in the dot pattern in the drawings), when repeatedly applying the dither mask to image data in the halftone processing, the sub-scanning position of the nozzle and the sub-scanning position of the dither mask have a fixed correspondence relation, and the correspondence relation will not change.

FIG. 5 shows a case in which no defective nozzle exists. FIG. 6 shows a case in which the dither mask 210 is used as it is when a defective nozzle exists. FIG. 7 shows a case in which a dither mask 220 in which the dither mask 210 is altered is used when a defective nozzle exists.

When the flow shown in FIG. 4 starts, the interpolation processing section 140 specifies the mask position corresponding to the defective nozzle detected by Step S7 (Step S81). Concretely, the interpolation processing section 140 specifies the sub-scanning position of the dither mask 210 corresponding to the nozzle position of the defective nozzle to specify the mask position of the sub-scanning position. For example, as shown FIG. 6, in the case where the nozzle position 2 is a defective nozzle, the interpolation processing section 140 specifies eight mask positions (2:1 to 8) on the line of the sub-scanning position 2.

Then, the interpolation processing section 140 selects one attentional mask position from one or more mask positions specified in Step S81 (Step S82). The attentional mask position can be selected, for example, in the main scanning direction.

Then, the interpolation processing section 140 judges whether or not the dot at the attentional mask position selected in Step S82 is ON (Step S83). Specifically, the interpolation processing section 140 compares the gradation value D determined based on a predetermined duty previously held by the storing section 200, etc., and the threshold TH of the attentional mask position. The interpolation processing section 140 judges, when the gradation value D is larger than the threshold TH, that the dot corresponding to the attentional mask position is ON(1). On the other hand, the interpolation processing section 140 judges, when the gradation value D is equal to or less than the threshold TH, that the dot corresponding to the attentional mask position is OFF(0).

Here, the duty denotes the ink hitting amount (also referred to as "ejection amount") per unit area. For example, supposing that the predetermined duty is 61% (0.61), and the number of possible value of the threshold TH of the dither mask 210 is 64 (0 to 63), the relation to the gradation value D will be 0.61=D/64. By solving this equation, the gradation value D will be about 39. In this case, the gradation value D corresponding to each mask position of the dither mask 210 is all 39. In FIG. 5, the comparison results of the threshold TH of each mask position of the dither mask 210 and the gradation value D (39) corresponding to each mask position when no defective nozzle exists are shown as dot pattern (0: OFF, 1: ON). Further, in FIG. 6, the comparison results of the threshold TH of each mask position of the dither mask 210 and the gradation value D (39) corresponding to each mask position when a defective nozzle exists are shown as dot pattern (0: OFF, 1: ON, x: defective nozzle). By performing such comparison, it becomes possible to judge whether or not the dot corresponding to the attentional mask position is ON.

In the case where the dot of the attention mask position is OFF (N in Step S83), the interpolation processing section 140 forwards the processing to Step S89. For example, in FIG. 6, it is judged that the dot of the attentional mask position (2:1) is ON, and judged that the attentional mask position (2:3) is OFF.

In the case where the dot of the attention mask position is ON (Y in Step S83), the interpolation processing section 140 judges whether or not the dot of the upper adjacent mask position of the attentional mask position is ON(Step S84). The upper adjacent mask position is a mask position belonging to a line one above the line to which the attentional mask position belongs among mask positions adjacent to the attentional mask position. For example, in FIG. 6, the upper adjacent mask position of the attentional mask position (2:1) is a mask position (1:1). The interpolation processing section 140 compares the gradation value D determined based on a predetermined duty previously held by the storing section 200, etc., and the threshold TH of the upper adjacent mask position. Then, the interpolation processing section 140 judges, when the gradation value D is equal to or larger than the threshold TH, that the dot corresponding to the upper adjacent mask position is ON(1). On the other hand, the interpolation processing section 140 judges, when the gradation value D is equal to or less than the threshold TH, that the dot corresponding to the upper adjacent mask position is OFF(0).

In the case where the dot of the upper adjacent mask position is OFF (N in Step S84), as to the dither mask 210 obtained from the storing section 200, the interpolation processing section 140 reverses the threshold of the attentional mask position and the threshold of the upper adjacent mask position (Step S85). For example, as shown in the transition from FIG. 6 to FIG. 7, the threshold 30 of the attentional mask position (2:1) and the threshold 39 of the upper adjacent mask position (1:1) are reversed. In FIG. 7, the reversed thresholds are underlined. Then, the interpolation processing section 140 forwards the processing to Step S89.

In the case where the dot of the upper adjacent mask position of the attentional mask position is ON (Y in Step S84), the interpolation processing section 140 judges whether or not the dot of the lower adjacent mask position of the attentional mask position is ON (Step S86). The lower adjacent mask position is a mask position belonging to a line one below the line to which the attentional mask position belongs among mask positions adjacent to the attentional mask position. For example, in FIG. 6, the lower adjacent mask position of the attentional mask position (2:2) is a mask position (3:2). The interpolation processing section 140 compares the gradation value D determined based on a predetermined duty previously held by the storing section 200, etc., and the threshold TH of the lower adjacent mask position. Then, the interpolation processing section 140 judges, when the gradation value D is equal to or larger than the threshold TH, that the dot corresponding to the lower adjacent mask position is ON(1). On the other hand, the interpolation processing section 140 judges, when the gradation value D is equal to or less than the threshold TH, that the dot corresponding to the lower adjacent mask position is OFF(0).

In the case where the dot of the lower adjacent mask position of the attentional mask position is OFF (N in Step S86), as to the dither mask 210 obtained from the storing section 200, the interpolation processing section 140 reverses the threshold of the attentional mask position and the threshold of the lower adjacent mask position (Step S87). For example, as shown in FIG. 6 and FIG. 7, the threshold 21 of the attentional mask position (2:1) and the threshold 43 of the lower adjacent mask position (3:2) are reversed. Then, the interpolation processing section 140 forwards the processing to Step S89.

In the case where the dot of the lower adjacent mask position of the attentional mask position is ON (Y in Step S86), the interpolation processing section 140 sets such that the dot sizes of the upper adjacent mask position and the lower adjacent mask position of the attentional mask position become larger than a normal size (Step S88). For example, the interpolation processing section 140 outputs setting including an instruction for enlarging the dot in association with the upper adjacent mask position and the lower adjacent mask position. For example, as shown in FIG. 6 and FIG. 7, setting for enlarging the dot size at the dot position corresponding to the upper adjacent mask position (1:7) of the attentional mask position (2:7) and the dot position corresponding to the lower adjacent mask position (3:7) is performed. In FIG. 7, the mask position in which setting for enlarging the dot size was performed is shown by a thick frame. The interpolation processing section 140 executes the processing of Step S88 and forwards the processing to Step S89.

At the time of performing the dither processing using the dither mask 220 in which the mask value was altered by the interpolation processing section 140, the halftone processing section 120 associates the pixel on the image data corresponding to the mask position in which setting for enlarging the dot size was performed with the setting for enlarging the dot size in the case where the dot of the pixel becomes ON. At the time of driving the print executing section 300 based on the print data, as to the dot associated with the setting for enlarging a dot, the print controlling section 100 drives the corresponding nozzle so that the dot size increases.

After Step S83, Step S85, Step S87 or Step S88, the interpolation processing section 140 judges whether or not all of the mask positions corresponding to the defective nozzles specified in Step S81 were selected in Step S82 (Step S89). In the case where all of the mask positions are not selected (N in Step S89), the interpolation processing section 140 returns the processing to Step S82. In the case where all of the mask positions are selected (Y in Step S89), the interpolation processing section 140 terminates the processing shown in the flow in FIG. 4.

As explained above, depending on the threshold of the mask position corresponding to the defective nozzle, the previously prepared dither mask 210 is altered, and the halftone processing is performed using the altered dither mask 220. By doing this, since the dot incapable of being formed by a defective nozzle can be formed at the nearest adjacent position, it becomes possible to prevent decrease in the number of dots per unit area and also prevent deterioration of the gradation of the image quality. Further, depending on the threshold of the mask position corresponding to the defective nozzle position, the dot at the adjacent position can be enlarged, it becomes possible to prevent deterioration of the dot concentration per unit area and also prevent deterioration of the gradation of the image quality. Further, the previously prepared dither mask 210 is altered and then subjected to the halftone processing, and therefore there is no need to increase the number of dither masks to be prepared previously and also no need to increase the memory source.

As compared with error diffusion processing, etc., the dither processing causes less deterioration of image quality even in cases where the dot formation position is shifted due to movement errors of a carriage or a paper conveyance, etc. Therefore, by executing the processing of this embodiment when defective nozzles are occurred, even in cases where a positional displacement of a dot formation position or a defective nozzle is occurred, it becomes possible to cope with a defective nozzle while restraining white streaks or black streaks caused by movement errors of a carriage or a paper conveyance. This enhances the usability of a printer.

An embodiment of the present invention was explained above. According to this embodiment, at the time of altering a dither mask when a defective nozzle is occurred, a resource required for a dither mask can be reduced, and even if a defective nozzle is occurred, the deterioration of gradation by dither processing can be prevented.

Next, a modified embodiment of the aforementioned embodiment will be explained.

In the aforementioned embodiment, when repeatedly applying the dither mask to processing target image data in the halftone processing, as to any raster position of the image data, the sub-scanning position of the nozzle and the sub-scanning position of the dither mask have a fixed correspondence relation, and the correspondence relation will not change. For example, as shown in FIG. 5, the sub-scanning positions 1 to 8 of a nozzle correspond to the sub-scanning direction 1 to 8 of the dither mask. On the other hand, in this modified embodiment, depending on the raster position of the processing target image data, the correspondence relation between the sub-scanning position of the nozzle and the sub-scanning position of the dither mask changes. This point will be mainly explained with reference to FIG. 4 and FIGS. 8 to 10.

Figure 8:
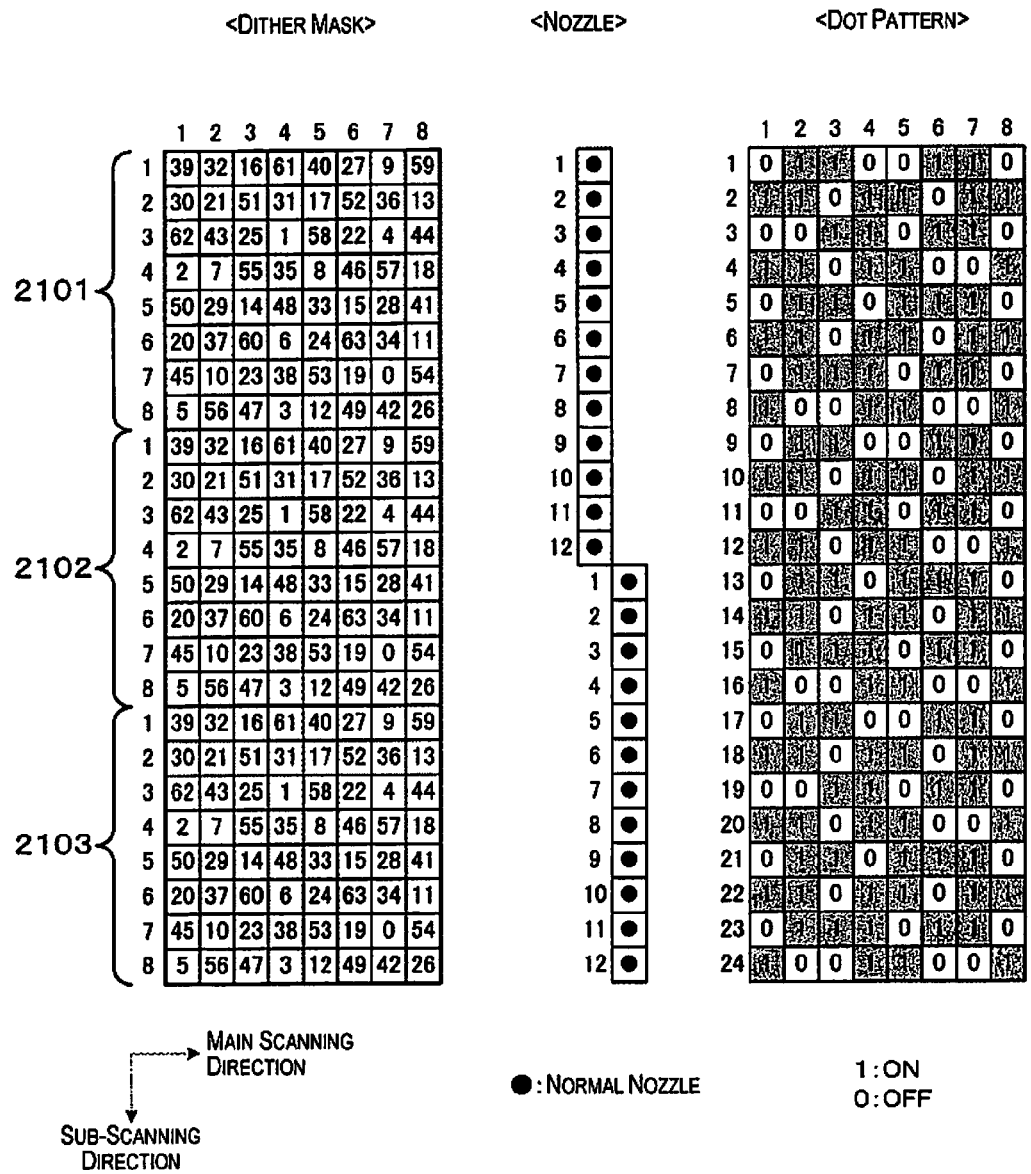
FIG. 8 is a view (part 1) conceptually explaining interpolation processing in the case where a relation between a mask position and a nozzle position changes.
Figure 9:
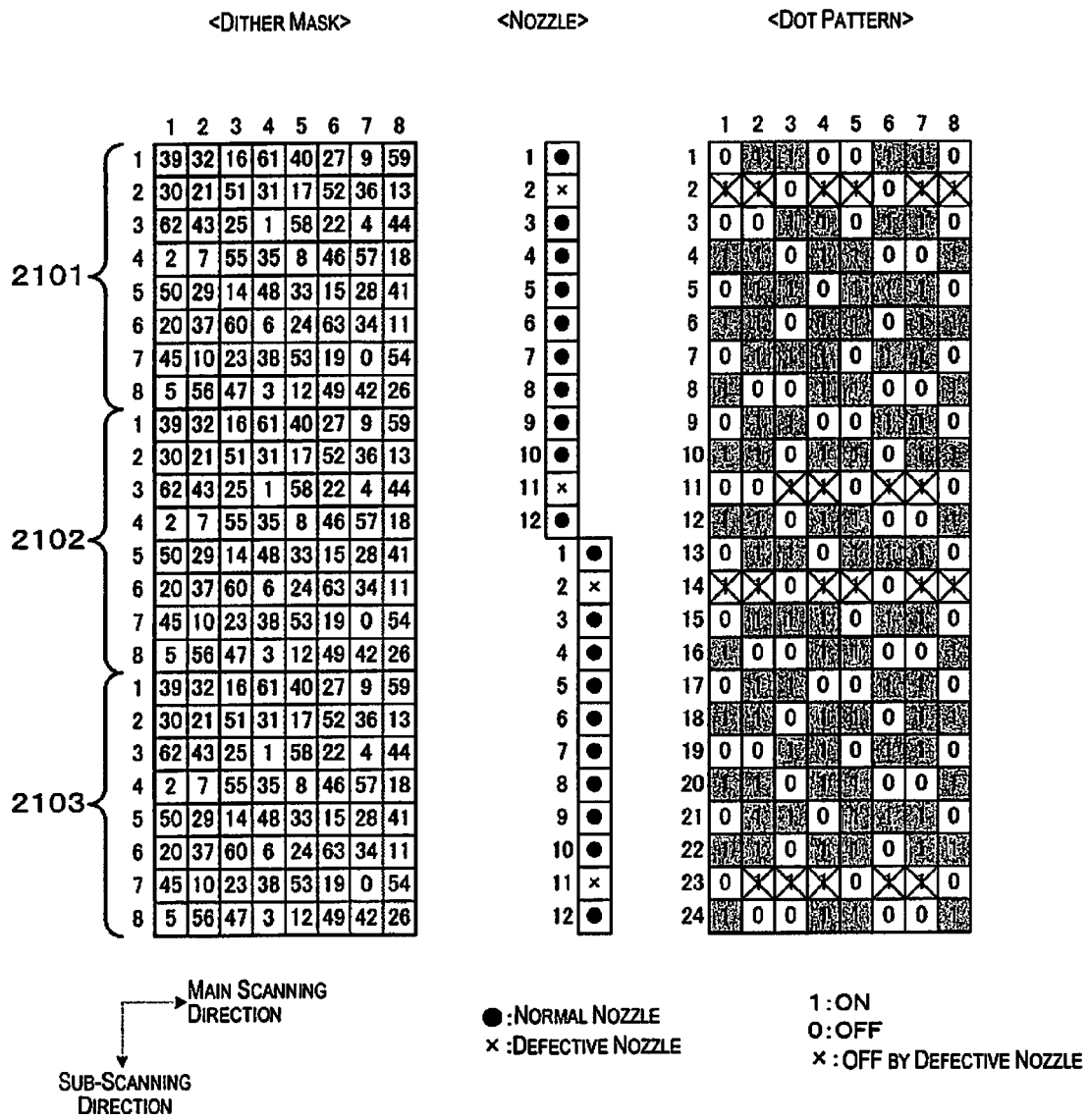
FIG. 9 is a view (part 2) conceptually explaining interpolation processing in the case where a relation between a mask position and a nozzle position changes.
Figure 10:
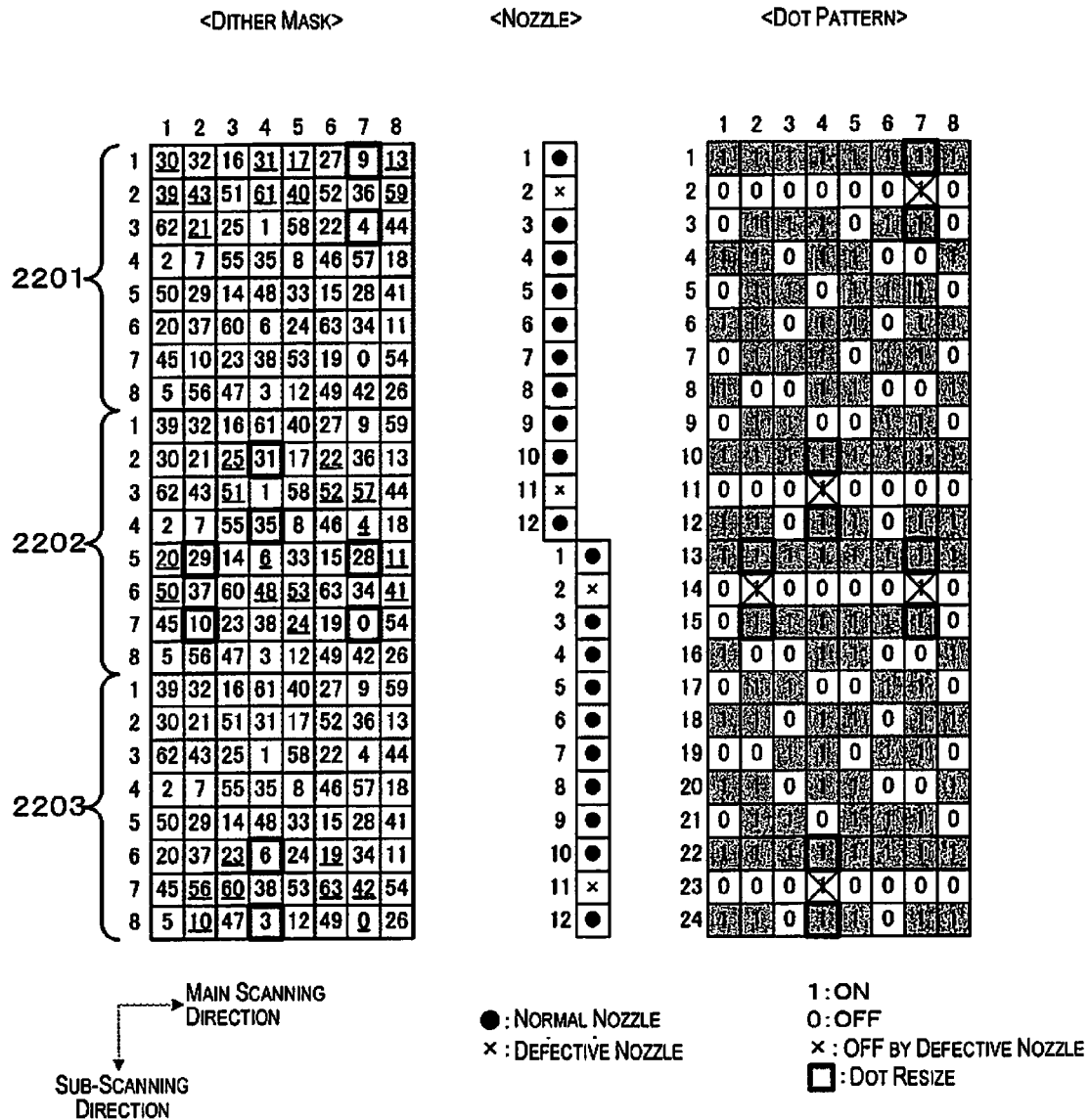
FIG. 10 is a view (part 3) conceptually explaining interpolation processing in the case where a relation between a mask position and a nozzle position changes.

FIG. 8 is a view (part 1) conceptually explaining the interpolation processing in the case where a correspondence between a mask position and a nozzle position changes. FIG. 9 is a view (part 2) conceptually explaining the interpolation processing in the case where a correspondence between a mask position and a nozzle position changes. FIG. 10 is a view (part 3) conceptually explaining the interpolation processing in the case where a correspondence between a mask position and a nozzle position changes.

FIGS. 8 to 10 show the case in which an 8×8 dither mask is repeatedly applied to image data in the same manner as in FIGS. 5 to 7. The dither mask 2101, 2102, and 2103 shown in FIGS. 8 and 9 correspond to a previously prepared dither mask 210, and the dither mask 2201, 2202, and 2203 shown in FIG. 10 correspond to a dither mask 220 after interpolation processing.

Here, in FIGS. 8 to 10, the print head is provided with twelve nozzles arranged in the sub-scanning direction. The number of nozzles and the width of the dither mask in the sub-scanning direction do not coincide. Therefore, when repeatedly applying the dither mask to processing target image data in the halftone processing, depending on the raster position (corresponding to the sub-scanning position in the dot pattern in the drawings), the correspondence relation of the sub-scanning position of the nozzle and the sub-scanning position of the dither mask changes.

For example, in the raster positions 1 to 12, the sub-scanning positions 1 to 8 of the nozzle and the sub-scanning positions 1 to 8 of the dither mask correspond, and the sub-scanning positions 9 to 12 of the nozzle and the sub-scanning positions 1 to 4 of the dither mask correspond. Further, in the raster positions 13 to 24, the sub-scanning positions 1 to 4 of the nozzle and the sub-scanning positions 5 to 8 of the dither mask correspond, and the sub-scanning positions 5 to 12 of the nozzle and the sub-scanning positions 1 to 8 of the dither mask correspond. Thereafter, the aforementioned correspondence relation will be repeated. That is, as a relation of the sub-scanning positions of the nozzle to the sub-scanning positions of the dither mask, there are three patterns, (1) sub-scanning positions 1 to 8 of the nozzle, (2) sub-scanning positions 9 to 12, and 1 to 4 of the nozzle, and (3) sub-scanning positions 5 to 12 of the nozzle.

FIG. 8 shows a case in which no defective nozzle exists. FIG. 9 shows a case in which the dither mask 210 is used as it is when a defective nozzle exists. FIG. 10 shows a case in which the dither mask 210 is used as it is when a defective nozzle exists.

When the flow shown in FIG. 4 starts, the interpolation processing section 140 specifies the mask position corresponding to the defective nozzle detected by Step S7 (Step S81). This processing is different from that of the aforementioned embodiment.

Concretely, the interpolation processing section 140 specifies the raster position of the image data corresponding to the nozzle position of the defective nozzle. Further, the interpolation processing section 140 specifies the sub-scanning position of the dither mask 210 to be applied to a specified raster position to specify the mask position of the sub-scanning position. The interpolation processing section 140 can obtain the raster position corresponding to the defective nozzle position from, for example, the formula: $L=M+N_{i-1}$ (M: defective nozzle position), N: the number of nozzles, i: the number of scanning 1 to I). For example, as shown in FIG. 9, the case in which the nozzle positions 2 and 11 are defective nozzles. In this case, the interpolation processing section 140 specifies the raster position L1 ($L1=2+12_{i-1}$) corresponding to the defective nozzle position 2 and the raster position L2 ($L2=11+12_{i-1}$) corresponding to the defective nozzle position 11. Then, the interpolation processing section 140 specifies the sub-scanning position (any one of 1 to 8) of the dither mask 210 to be applied to each specified raster position L1 and the sub-scanning position (any one of 1 to 8) of the dither mask 210 to be applied to each specified raster position L2.

As mentioned above, in the case of an example of FIG. 9, since the relation of the sub-scanning positions of the nozzle to the sub-scanning positions 1 to 8 of the dither mask includes three patterns, it can be configured such that the raster positions corresponding to the defective nozzle positions are specified within the range of the raster positions 1 to 24 and specifies the sub-scanning positions of the dither mask corresponding to each specified raster positions.

Then, the interpolation processing section 140 specifies the mask position of the specified sub-scanning positions. For example, as shown in FIG. 9, the interpolation processing section 140 specifies eight mask positions (2:1 to 8) on the line of the sub-scanning position 2 of the dither mask 2102 applied to the raster position 2, eight mask positions (3:1 to 8) on the line of the sub-scanning position 3 of the dither mask 2102 applied to the raster position 11, eight mask positions (6:1 to 8) on the line of the sub-scanning position 6 of the dither mask 2102 applied to the raster position 14, and eight mask positions (7:1 to 8) on the line of the sub-scanning position 7 of the dither mask 2103 applied to the raster position 23.

The processing of Steps S82 to S89 are the same as those of the aforementioned embodiments, and therefore the explanation will be omitted. As a result, the interpolation processing section 140 can obtain, for example, as shown in FIG. 10, the dither mask 2201 for the dither mask 2101, the dither mask 2202 for the dither mask 2102, the dither mask 2203 for the dither mask 2103 (hereinafter, the same will be repeated). Of course, the pattern of the dither mask 220 includes three specific patterns of the dither mask 2201, 2202, and 2203, and therefore it can be configured to obtain these three patterns.

As explained above, even in cases where the correspondence relation of the sub-scanning position of the nozzle and the sub-scanning position of the dither mask changes depending on the raster position of the image data, the mask positions corresponding to the defective nozzle positions are specified, and depending on the threshold of the mask positions, the previously prepared dither mask 210 is altered, and the halftone processing is performed using the altered dither mask 220.

The aforementioned embodiments and modified embodiments of the present invention are intended to exemplify the gist and range of the present invention, and not intended to limit them.

For example, in the flow of FIG. 4, in the case where both the dot of the upper adjacent mask position and the dot of the lower adjacent mask position of the attentional mask position are OFF, the threshold of the upper adjacent mask position is preferentially altered. It can be, however, configured such that the threshold of the lower adjacent mask position is preferentially altered. In other words, the processing in Steps S84 and S85 and the processing in Steps S86 and S87 can be replaced in arrangement.

Further, in the aforementioned embodiment and modified embodiment, the threshold of the attentional mask position and the threshold of the adjacent mask position are reversed. However, for example, without reversing the threshold of the attentional mask position and the threshold of the adjacent mask position, the threshold of the adjacent mask position can be set to 0. By doing this, the dot corresponding to the adjacent mask position can be formed more assuredly.

Further, in the aforementioned embodiment and modified embodiment of the present invention, the dot size of the upper adjacent mask position and the lower adjacent mask position of the attentional mask position is set to be larger than a normal size. However, either one of the upper adjacent mask position and the lower adjacent mask position can be set to be larger than a normal size.

Further, in the aforementioned embodiment and modified embodiment of the present invention, the dither mask of 8×8 is exemplified, but not limited to it. For example, the dither mask can be formed into a larger size such as 16×16 or a size smaller than 8×8.

Further, the interpolation processing section 140 can use, for example, in place of the gradation value D determined based on a predetermined duty, a gradation value D based on the image data (Step S3 of FIG. 3) after the color conversion as a gradation value D. In this case, as one example, an average of gradation values of pixels in the region within the image data to which the dither mask 210 is applied is obtained and used as a gradation value D. Further, as another example, the gradation value of each pixel in the region within the image data to which the dither mask 210 is applied is used as a gradation value D which is compared with the threshold of each mask position of the dither mask 210. In the case in which the dither mask is 8×8, the width of the gradation value of the image data is 0 to 63.

The present invention is not limited to a printer as long as it is an image processing device performing dither processing, and can be applied to, for example, a multifunction device, a copying device, a computer such as an PC (Personal Computer), etc. Further, the present invention can be provided not only as an image processing device, a dither mask generation method, a program, etc., but also as a dither mask generation device for generating a dither mask, etc.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. An image processing device comprising:
    a storing section configured to store a predetermined dither mask;
    a defective nozzle detecting section configured to detect a defective nozzle; and
    an interpolation processing section configured to specify a mask position corresponding to a position of the detected defective nozzle among mask positions included in the dither mask, and alter a threshold of a predetermined mask position so that a dot of the predetermined mask position included in the dither mask becomes ON when a dot of the specified mask position is ON.

2. The image processing device according to claim 1, wherein
    the interpolation processing section specifies a raster position of processing target image data corresponding to the position of the detected defective nozzle, and specifies a mask position corresponding to the specified raster position in a case in which the dither mask is repeatedly applied to the image data.

3. The image processing device according to claim 1, wherein,
    in a case in which a dot of the specified mask position is ON, the interpolation processing section specifies an upper adjacent mask position belonging to an upper line adjacent to a line to which the specified mask position belongs or a lower adjacent mask position belonging to a lower line, and alters a threshold of the upper adjacent mask position or the lower adjacent mask position so that a dot of the upper adjacent mask position or the lower adjacent mask position becomes ON.

4. The image processing device according to claim 3, wherein when both dots of the upper adjacent mask position and the lower adjacent mask position are OFF, the interpolation processing section reverses a threshold of the specified mask position and a threshold of either one of the upper adjacent mask position and the lower adjacent mask position.

5. The image processing device according to claim 3, wherein when a dot of one of the upper adjacent mask position and the lower adjacent mask position is ON and a dot of the other of the upper adjacent mask position and the lower adjacent mask position is OFF, the interpolation processing section reverses a threshold of the specified mask position and a threshold of the other of the upper adjacent mask position and the lower adjacent mask position.

6. The image processing device according to claim 3, wherein when both dots of the upper adjacent mask position and the lower adjacent mask position are ON, the interpolation processing section sets so that the size of at least one of the dots of the upper adjacent mask position and the lower adjacent mask position becomes larger.

7. The image processing device according to claim 1, wherein the interpolation processing section judges whether or not a dot of the mask position is ON by comparing a threshold of the mask position and a gradation value determined based on a predetermined duty.

8. A dither mask generation method comprising:

detecting a defective nozzle; and specifying a mask position corresponding to a position of the detected defective nozzle among mask positions included in a dither mask, and altering a threshold of a predetermined mask position so that a dot of the predetermined mask position included in the dither mask becomes ON when a dot of the specified mask position is ON.

9. A non-transitory computer readable medium storing a program causing an image processing device to execute:

detecting a defective nozzle; and specifying a mask position corresponding to a position of the detected defective nozzle among mask positions included in a dither mask, and altering a threshold of the predetermined mask position so that a dot of the predetermined mask position included in the dither mask becomes ON when a dot of the specified mask position is ON.

* * * * *